United States Patent
Miyano

(10) Patent No.: US 12,351,237 B2
(45) Date of Patent: Jul. 8, 2025

(54) DRIVING ASSISTANCE DEVICE, DRIVING ASSISTANCE METHOD, AND NON-TRANSITORY STORAGE MEDIUM

(71) Applicant: Toyota Jidosha Kabushiki Kaisha, Toyota (JP)

(72) Inventor: Kumiko Miyano, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 41 days.

(21) Appl. No.: 18/369,861

(22) Filed: Sep. 19, 2023

(65) Prior Publication Data

US 2024/0140529 A1    May 2, 2024

(30) Foreign Application Priority Data

Oct. 26, 2022    (JP) ................. 2022-171778

(51) Int. Cl.
*B62D 15/02*    (2006.01)
*G08G 1/16*    (2006.01)

(52) U.S. Cl.
CPC .......... *B62D 15/0265* (2013.01); *G08G 1/16* (2013.01)

(58) Field of Classification Search
CPC ...... B62D 15/0265; G08G 1/16; G08G 1/166; B60W 2554/4029; B60W 2554/408; B60W 30/085; B60W 30/0956; B60W 2554/40; B60W 2554/4026
See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 2019/0001968 A1 | 1/2019 | Yorifuji et al. | |
| 2019/0039614 A1 | 2/2019 | Nagata et al. | |
| 2019/0061743 A1 | 2/2019 | Ozawa et al. | |
| 2019/0071077 A1* | 3/2019 | Miyamoto | G01S 15/93 |

(Continued)

FOREIGN PATENT DOCUMENTS

| | | |
|---|---|---|
| JP | 2018-124663 A | 8/2018 |
| JP | 2019-028951 A | 2/2019 |
| JP | 2019-043313 A | 3/2019 |

*Primary Examiner* — Xiao En Mo
(74) *Attorney, Agent, or Firm* — Dinsmore & Shohl LLP

(57) ABSTRACT

A driving assistance device includes a sensor configured to detect a moving object ahead of a target vehicle and obstacles including a first obstacle and a second obstacle, and a control device. The control device is configured to determine whether the second obstacle is present. The second obstacle is located opposite to a traveling lane of the target vehicle with respect to the first obstacle in a lateral direction and forces the moving object to move in the lateral direction toward the traveling lane due to collaborative action with the first obstacle. The first obstacle hinders the moving object from moving in a longitudinal direction. The control device is configured to relax an execution condition of steering assistance for detouring around the moving object in a case where the second obstacle is present rather than in a case where the second obstacle is not present.

12 Claims, 9 Drawing Sheets

CASE 1      CASE 2      CASE 3

(56) References Cited

U.S. PATENT DOCUMENTS

| | | |
|---|---|---|
| 2019/0088136 A1 | 3/2019 | Nagata et al. |
| 2019/0344828 A1 | 11/2019 | Omori et al. |
| 2019/0389488 A1 | 12/2019 | Yamada |
| 2022/0194364 A1 | 6/2022 | Ohno et al. |
| 2024/0038069 A1* | 2/2024 | Baba ................ G08G 1/096775 |

* cited by examiner

CASE 1  CASE 2  CASE 3

CASE 3'    CASE 7'

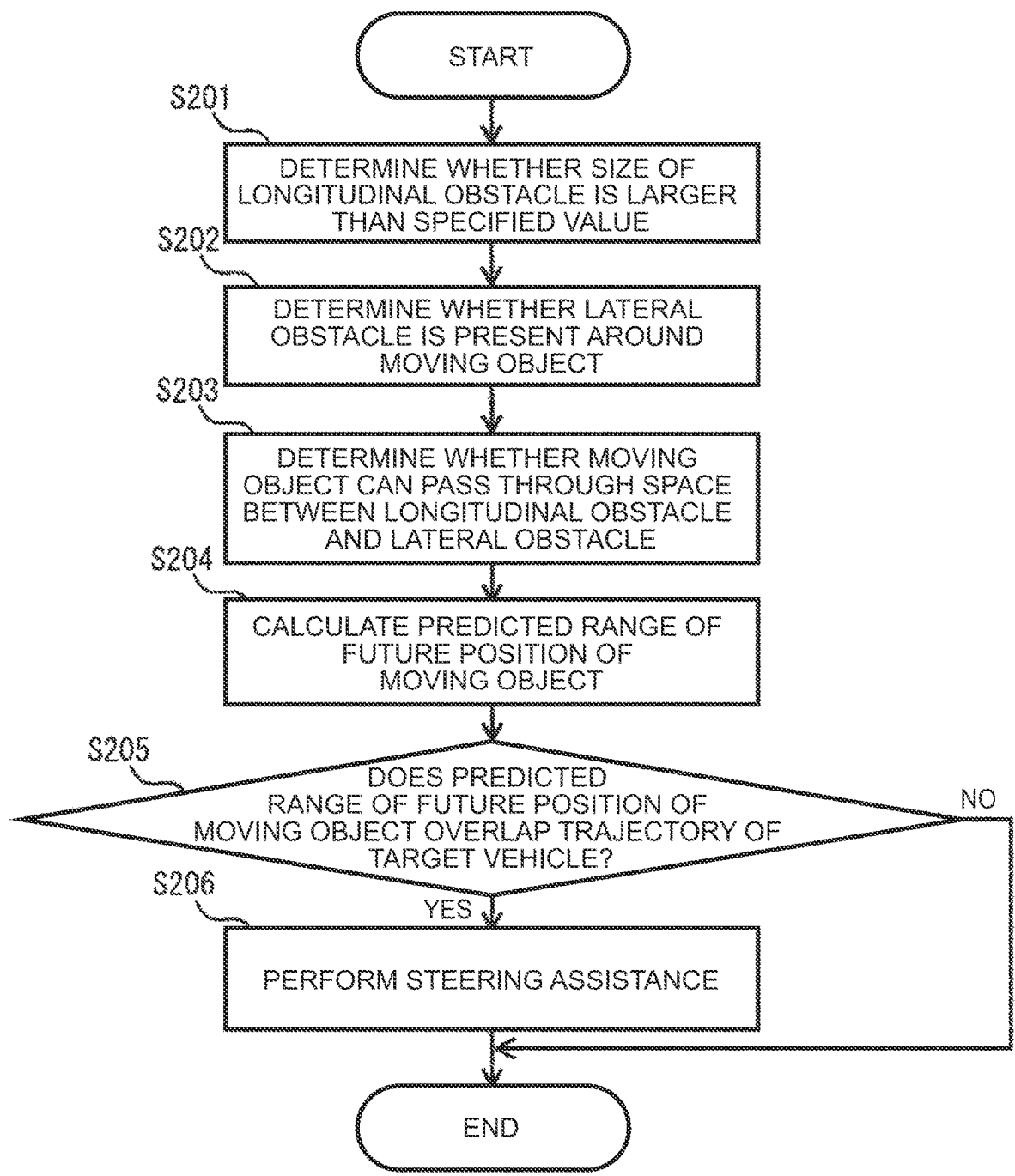

DRIVING ASSISTANCE DEVICE, DRIVING ASSISTANCE METHOD, AND NON-TRANSITORY STORAGE MEDIUM

CROSS-REFERENCE TO RELATED APPLICATION

This application claims priority to Japanese Patent Application No. 2022-171778 filed on Oct. 26, 2022, incorporated herein by reference in its entirety.

BACKGROUND

1. Technical Field

The present disclosure relates to a driving assistance device, a driving assistance method, and a non-transitory storage medium.

2. Description of Related Art

Japanese Unexamined Patent Application Publication No. 2019-028951 (JP 2019-028951 A) discloses a technology for avoiding collision with a pedestrian coming out in front of a target vehicle. In the related art, it is assumed that the pedestrian comes out into a road to avoid an obstacle present in the pedestrian's moving direction. In the related art, when there is a pedestrian in an assistance area set behind the obstacle, determination is made that the pedestrian will come out in front of the target vehicle with a high probability. In this case, steering assistance is performed so that the target vehicle moves away from the pedestrian.

According to the above technology, the risk of collision with the pedestrian can be reduced as the assistance area is expanded. When the assistance area is made excessively large, unnecessary steering assistance is performed frequently to annoy an occupant. When the assistance area is made excessively small, a pedestrian who may come out toward the target vehicle may be outside the assistance area. In the above technology, no steering assistance is performed for the pedestrian outside the assistance area. Therefore, the collision risk may increase when the pedestrian outside the assistance area comes out in front of the target vehicle. Thus, it is important to set the assistance area to an appropriate range in order to avoid collision with the pedestrian who comes out in front of the target vehicle.

In the above technology, the range of the assistance area is determined based only on the obstacle present in the pedestrian's moving direction. Whether the pedestrian comes out in front of the target vehicle depends certainly on a positional relationship between the pedestrian and the obstacle that hinders the movement of the pedestrian. However, the obstacle present in the pedestrian's moving direction is not the only factor that determines the pedestrian's moving direction. When there is a wall or hedge opposite to the target vehicle with respect to the obstacle, the pedestrian's moving direction is restricted by the wall or hedge. The possibility that the pedestrian will come out in front of the target vehicle differs depending on the presence or absence of such restriction.

Japanese Unexamined Patent Application Publication No. 2019-043313 (JP 2019-043313 A) can be exemplified as a document indicating the technical level of the technical field related to the present disclosure.

SUMMARY

The present disclosure provides an improved technology capable of avoiding collision with a moving object such as a pedestrian coming out in front of a target vehicle while suppressing occupant's annoyance.

A driving assistance device according to a first aspect of the present disclosure includes a sensor configured to detect a moving object ahead of a target vehicle and obstacles including a first obstacle and a second obstacle, and a control device. The control device is configured to determine whether the second obstacle is present. The second obstacle is located opposite to a traveling lane of the target vehicle with respect to the first obstacle in a lateral direction and forces the moving object to move in the lateral direction toward the traveling lane due to collaborative action with the first obstacle. The first obstacle hinders the moving object from moving in a longitudinal direction. The longitudinal direction is a direction along the traveling lane of the target vehicle. The lateral direction is a width direction of the traveling lane of the target vehicle. The control device is configured to relax an execution condition of steering assistance for detouring around the moving object in a case where the second obstacle is present rather than in a case where the second obstacle is not present.

A driving assistance method according to a second aspect of the present disclosure includes detecting, by a sensor, a moving object ahead of a target vehicle and obstacles including a first obstacle and a second obstacle, determining, by a control device, whether the second obstacle is present, and relaxing, by the control device, an execution condition of steering assistance for detouring around the moving object in a case where the second obstacle is present rather than in a case where the second obstacle is not present. The second obstacle is located opposite to a traveling lane of the target vehicle with respect to the first obstacle in a lateral direction and forces the moving object to move in the lateral direction toward the traveling lane due to collaborative action with the first obstacle. The first obstacle hinders the moving object from moving in a longitudinal direction. The longitudinal direction is a direction along the traveling lane of the target vehicle. The lateral direction is a width direction of the traveling lane of the target vehicle.

A non-transitory storage medium according to a third aspect of the present disclosure is configured to store instructions that are executable by one or more processors and that cause the one or more processors to perform functions. The functions include determining whether a second obstacle is present, and relaxing an execution condition of steering assistance for detouring around a moving object ahead of a target vehicle in a case where the second obstacle is present rather than in a case where the second obstacle is not present. The second obstacle is located opposite to a traveling lane of the target vehicle with respect to a first obstacle in a lateral direction and forces the moving object to move in the lateral direction toward the traveling lane due to collaborative action with the first obstacle. The first obstacle hinders the moving object from moving in a longitudinal direction. The moving object, the first obstacle, and the second obstacle are detected by a sensor. The longitudinal direction is a direction along the traveling lane of the target vehicle. The lateral direction is a width direction of the traveling lane of the target vehicle.

When the second obstacle is present, the moving object ahead of the target vehicle is forced to move in the lateral direction toward the traveling lane of the target vehicle due to the collaborative action of the first obstacle and the second obstacle. Therefore, in the case where the second obstacle is present, the moving object may come out in front of the target vehicle with a higher possibility than in the case where the second obstacle is not present. According to the technology of the present disclosure, the execution condition of the steering assistance for detouring around the moving object is relaxed in the case where the second obstacle is present rather than in the case where the second obstacle is not present. Thus, it is possible to avoid collision with the moving object coming out in front of the target vehicle due to the collaborative action of the first obstacle and the second obstacle. Conversely, the execution condition of the steering assistance for detouring around the moving object is strengthened in the case where the second obstacle is not present rather than in the case where the second obstacle is present. Thus, occupant's annoyance due to intervention of unnecessary steering assistance is suppressed.

In the driving assistance device according to the first aspect of the present disclosure, the control device may be configured to relax the execution condition of the steering assistance by at least performing the steering assistance when the moving object is located in an assistance execution area extending from the first obstacle toward the moving object in the longitudinal direction, and expanding the assistance execution area in the case where the second obstacle is present rather than in the case where the second obstacle is not present. By expanding the assistance execution area, the moving object may enter the assistance execution area with a higher possibility, and the steering assistance for detouring around the moving object is more likely to be performed.

In the driving assistance device according to the first aspect of the present disclosure, the control device may be configured to expand the assistance execution area by at least expanding the assistance execution area from a near side to a far side of the traveling lane in the lateral direction. When the second obstacle is not present, the moving object located away from the target vehicle has a low possibility of moving toward the target vehicle. When the second obstacle is present, the moving object located away from the target vehicle is forced to move in the lateral direction toward the target vehicle. When the assistance execution area is expanded, the steering assistance for avoiding collision with the moving object can be performed not only for the moving object located near the target vehicle but also for the moving object located away from the target vehicle.

In the driving assistance device according to the first aspect of the present disclosure, the control device may be configured to expand the assistance execution area by at least setting, when the second obstacle is not present, a first area near the traveling lane with respect to the first obstacle in the lateral direction as the assistance execution area, and setting, when the second obstacle is present, the first area and a second area opposite to the traveling lane with respect to the first obstacle in the lateral direction as the assistance execution area.

In the driving assistance device according to the first aspect of the present disclosure, the control device may be configured to expand the assistance execution area by at least not providing the assistance execution area when the second obstacle is not present, and providing the assistance execution area when the second obstacle is present. Depending on the size of the first obstacle, the moving object does not always come out toward the target vehicle even if the first obstacle hinders the moving object from moving in the longitudinal direction. When the assistance execution area is provided in such a case, the occupant may feel annoyed by frequent operations of unnecessary steering assistance. By providing the assistance execution area only when the second obstacle is present and the moving object is forced to move in the lateral direction toward the traveling lane, it is possible to avoid collision with the moving object coming out in front of the target vehicle while suppressing occupant's annoyance.

In the driving assistance device according to the first aspect of the present disclosure, the control device may be configured to provide the assistance execution area by at least setting an area opposite to the traveling lane with respect to the first obstacle in the lateral direction as at least a part of the assistance execution area. According to the above configuration, the steering assistance for avoiding collision with the moving object can be performed for the moving object having a low possibility of coming out in front of the target vehicle unless the second obstacle is present.

In the driving assistance device according to the first aspect of the present disclosure, the control device may be configured to relax the execution condition of the steering assistance by at least performing the steering assistance when a predicted range of a future position of the moving object overlaps a trajectory of the target vehicle, and setting the predicted range closer to the traveling lane in the lateral direction in the case where the second obstacle is present than in the case where the second obstacle is not present. By setting the predicted range closer to the traveling lane in the lateral direction, the predicted range is more likely to overlap the trajectory of the target vehicle, and the steering assistance for detouring around the moving object is more likely to be performed.

In the driving assistance device according to the first aspect of the present disclosure, the second obstacle may be an object in which a distance from the first obstacle in the lateral direction is smaller than a lower limit value.

In the driving assistance device according to the first aspect of the present disclosure, the second obstacle may be an obstacle that forces the moving object to move in the lateral direction toward the traveling lane due to action caused by combination and coordination of action of the second obstacle on the moving object and action of the first obstacle on the moving object.

In the driving assistance device according to the first aspect of the present disclosure, the second obstacle may be an obstacle expected to increase a probability of movement of the moving object in the lateral direction toward the traveling lane due to a physical constraint on the moving object from a positional relationship among three elements including the second obstacle, the first obstacle, and the moving object.

As described above, according to the present disclosure, the execution condition of the steering assistance for detouring around the moving object is relaxed in the case where the second obstacle is present rather than in the case where the second obstacle is not present. Thus, it is possible to avoid collision with the moving object coming out in front of the target vehicle while suppressing the occupant's annoyance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a flowchart showing a procedure of the driving assistance control according to the second embodiment of the present disclosure.

DETAILED DESCRIPTION OF EMBODIMENTS

1. Outline of Driving Assistance Control

FIGS. 1 to 4 are conceptual diagrams illustrating driving assistance control of the present disclosure. The driving assistance control is vehicle control to be performed by a driving assistance device 100 mounted on a vehicle 10 to avoid collision between the vehicle 10 and a forward object. The vehicle 10 may be an autonomous vehicle in which at least one of steering control, acceleration control, and deceleration control is performed by the driving assistance device 100. Hereinafter, the vehicle 10 including the driving assistance device 100 will be referred to as "target vehicle", and the outline of the driving assistance control will be described with a focus on a relationship between the target vehicle 10 and surrounding objects.

FIGS. 1 to 4 show the target vehicle 10 traveling in a traveling lane 2 defined by two lane marking lines 4, 6. In the examples shown in FIGS. 1 to 4, the target vehicle 10 travels on a left-hand traffic road. The left lane marking line 4 is a side strip (hereinafter referred to as "side strip 4"), and the right lane marking line 6 is a lane boundary line (hereinafter referred to as "lane boundary line 6").

Figure 1:
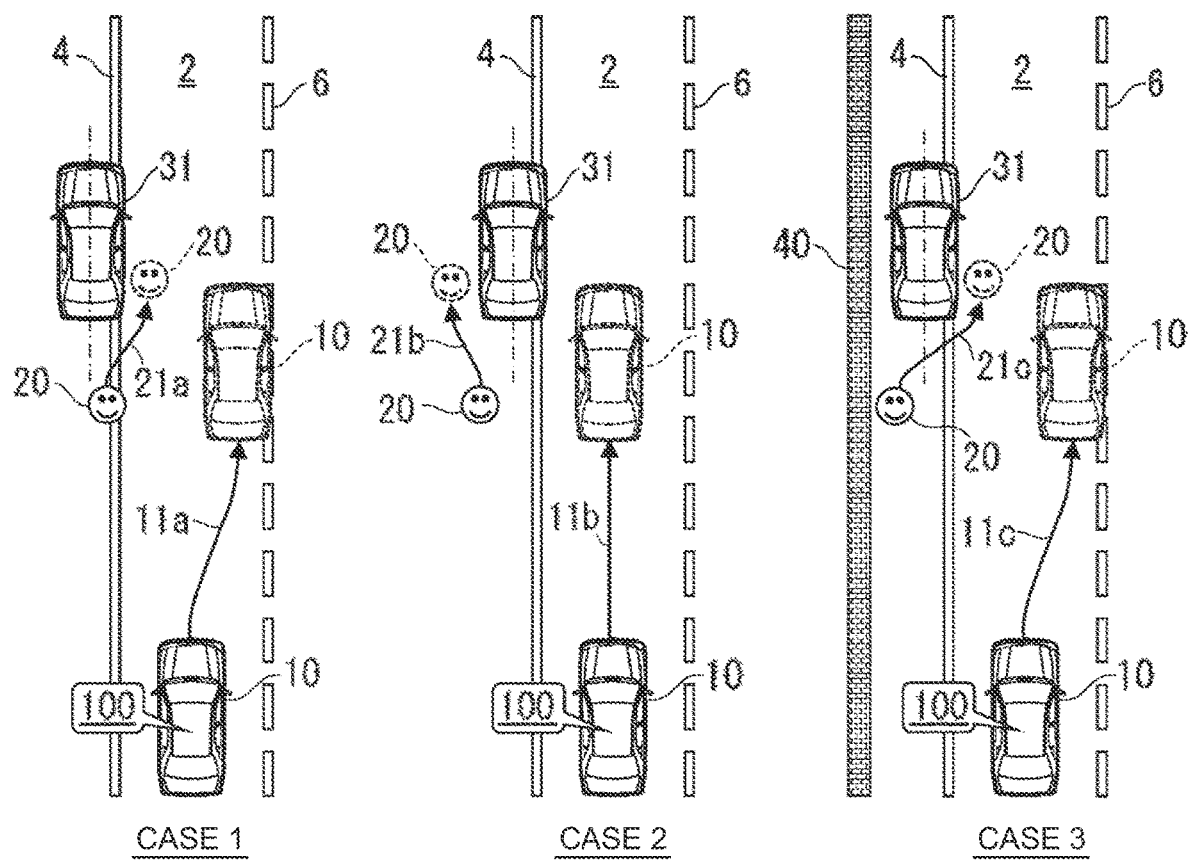
FIG. 1 is a diagram illustrating an outline of driving assistance control of the present disclosure.

In the example shown in FIG. 1, a pedestrian 20 is walking on the outer side of the side strip 4 in the same direction as a moving direction of the target vehicle 10. The pedestrian 20 is a moving object ahead of the target vehicle 10 when viewed from the target vehicle 10. The moving object herein means an object that moves outside a road at a speed lower than that of the target vehicle 10. The moving objects herein include bicycles and motorcycles in addition to pedestrians.

A parked vehicle 31 is present on the outer side of the side strip 4 ahead of the pedestrian 20 in his/her moving direction. The parked vehicle 31 is an obstacle that hinders the pedestrian 20 from moving in a longitudinal direction. The longitudinal direction means a direction along the road where the target vehicle 10 is traveling. An obstacle that hinders a moving object from moving in the longitudinal direction is herein referred to as "longitudinal obstacle". A longitudinal obstacle for the moving object ahead of the target vehicle 10, such as the parked vehicle 31 for the pedestrian 20 in FIG. 1, is herein referred to as "first obstacle". The longitudinal obstacle is not necessarily a stationary object such as the parked vehicle 31. The longitudinal obstacle for the moving object may be an object moving in the same direction as that of the moving object at a speed lower than the moving speed of the moving object. The longitudinal obstacle for the moving object may also be an object moving in a direction opposite to that of the moving object at a very low speed. The longitudinal obstacle may be, for example, a vehicle traveling at a very low speed or a group of people walking slowly.

The driving assistance device 100 mounted on the target vehicle 10 detects the pedestrian 20 and the parked vehicle 31. The driving assistance device 100 calculates a positional relationship between the detected pedestrian 20 and the detected parked vehicle 31, and determines whether to perform steering assistance for the target vehicle 10 based on the positional relationship between the two. In the determination as to whether to perform the steering assistance, routes of the pedestrian 20 to detour around the parked vehicle 31 to move forward are taken into consideration.

The routes of the pedestrian 20 to detour around the parked vehicle 31 to move forward include a detour route along the inner side of the parked vehicle 31 and a detour route along the outer side of the parked vehicle 31. The detour route along the inner side is a detour route close to the traveling lane 2, and the detour route along the outer side is a detour route away from the traveling lane 2. On the detour route along the inner side, the pedestrian 20 needs to walk in the traveling lane 2. Therefore, the pedestrian 20 tends to select the detour route along the outer side psychologically or habitually. However, a desire to select a shorter route is also a psychological aspect of the pedestrian 20. Therefore, when the detour route along the inner side is shorter than the detour route along the outer side, the detour route along the inner side may be selected with a higher possibility.

FIG. 1 shows three cases related to the positional relationship between the pedestrian 20 and the parked vehicle 31. The driving assistance control of the driving assistance device 100 will be described below for each case.

In Case 1, the pedestrian 20 is located on a right side of the center of the parked vehicle 31 in a lateral direction, that is, located near the traveling lane 2. The lateral direction means a width direction of the road where the target vehicle 10 is traveling. When the pedestrian 20 is located near the traveling lane 2 with respect to the center of the parked vehicle 31, the detour route along the inner side of the parked vehicle 31 is shorter than the detour route along the outer side of the parked vehicle 31. Therefore, in Case 1, determination can be made that the pedestrian 20 may select the detour route along the inner side with a higher possibility. To reduce the risk of collision with the pedestrian 20, it is appropriate that preventive control for avoiding collision with the pedestrian 20 be performed when the pedestrian 20 moves into the traveling lane 2 with a certain level of possibility or higher.

In Case 1, the pedestrian 20 is predicted to take the detour route along the inner side, that is, a course 21a. Therefore, the driving assistance device 100 performs steering assistance for the target vehicle 10 to detour around the pedestrian 20. Specifically, the driving assistance device 100 generates a target trajectory 11a for detouring around the expected course 21a of the pedestrian 20, and operates vehicle actuators so that the target vehicle 10 travels along the target trajectory 11a.

In Case 2, the pedestrian 20 is located opposite to the traveling lane 2 with respect to the center of the parked vehicle 31 in the lateral direction. In this case, the detour route along the outer side of the parked vehicle 31 is shorter than the detour route along the inner side of the parked vehicle 31. Therefore, the pedestrian 20 may select the detour route along the outer side with a high possibility. In this case, the pedestrian 20 has a low possibility of moving into the traveling lane 2. Therefore, it is appropriate not to perform the preventive control for avoiding collision with the pedestrian 20 so as not to annoy an occupant.

In Case 2, the pedestrian 20 is predicted to take the detour route along the outer side, that is, a course 21b. Therefore, the driving assistance device 100 does not perform the steering assistance for detouring around the pedestrian 20. The driving assistance device 100 operates the vehicle actuators so that the target vehicle 10 travels along a target trajectory 11b passing through the center of the traveling lane 2.

The positional relationship between the pedestrian 20 and the parked vehicle 31 in Case 3 is the same as the positional relationship in Case 2. In Case 3, a wall 40 is present along the side strip 4 on the outer side of the side strip 4. The driving assistance device 100 detects the wall 40 together with the pedestrian 20 and the parked vehicle 31. The driving assistance device 100 calculates a positional relationship among the detected pedestrian 20, the detected parked vehicle 31, and the detected wall 40, and determines whether to perform steering assistance for the target vehicle 10 based on the positional relationship between them.

In Case 3, the wall 40 is an obstacle that hinders the pedestrian 20 from moving in the lateral direction. An obstacle that hinders a moving object from moving in the lateral direction is herein referred to as "lateral obstacle". Other examples of the lateral obstacle include hedges, guardrails, fences at construction sites, and large-sized vehicles such as trucks and trailers. The lateral obstacle is not necessarily a stationary object such as the wall 40. For example, when many bicycles are traveling in a row, the pedestrian 20 cannot move in the lateral direction across the row. Therefore, even an entity such as a group of bicycles traveling in a row may be the lateral obstacle for the moving object.

The wall 40 is located opposite to the traveling lane 2 with respect to the parked vehicle 31 in the lateral direction. Therefore, in Case 3, the pedestrian 20 cannot detour along the outer side of the parked vehicle 31 due to the presence of the wall 40. When the pedestrian 20 cannot select the detour route along the outer side, the pedestrian 20 is forced to move in the lateral direction to approach the traveling lane 2, that is, toward the target vehicle 10.

The pedestrian 20 can pass between the wall 40 and the parked vehicle 31 depending on the positional relationship between the wall 40 and the parked vehicle 31. Therefore, the pedestrian 20 is forced to move in the lateral direction toward the target vehicle 10 due to collaborative action of the wall 40 and the parked vehicle 31 rather than action of the wall 40 alone. When a plurality of acting objects acts on an action-target object, the "collaborative action" is action caused by combination and coordination of actions of the acting objects on the action-target object. In Case 3, the action-target object is the pedestrian 20, and the acting objects are the wall 40 and the parked vehicle 31. More specifically, the pedestrian 20 is forced to move in the lateral direction toward the traveling lane 2 due to collaboration of the action of the parked vehicle 31 for hindering the pedestrian 20 from moving in the longitudinal direction and the action of the wall 40 for hindering the pedestrian 20 from moving away from the traveling lane 2, that is, combination and coordination of these actions. A lateral obstacle that is located opposite to the traveling lane 2 with respect to the first obstacle in the lateral direction and forces the moving object ahead of the target vehicle 10 to move in the lateral direction toward the traveling lane 2 due to the collaborative action with the first obstacle is herein referred to as "second obstacle". The phrase "forcing the moving object to move in the lateral direction" means an increase in the probability that the moving object moves in the lateral direction due to physical constraints on the moving object from the positional relationship between the obstacles and the moving object. In Case 3, there is an increase in the probability that the pedestrian 20 moves in the lateral direction due to physical constraints on the pedestrian 20 from the positional relationship among the three elements including the wall 40, the parked vehicle 31, and the pedestrian 20.

In Case 3, the pedestrian 20 is inevitably forced to select the detour route along the inner side of the parked vehicle 31. Therefore, the pedestrian 20 is predicted to move along a course 21c. Thus, in Case 3, the driving assistance device 100 performs steering assistance for the target vehicle 10 to detour around the pedestrian 20. Specifically, the driving assistance device 100 generates a target trajectory 11c for detouring around the expected course 21c of the pedestrian 20, and operates the vehicle actuators so that the target vehicle 10 travels along the target trajectory 11c.

In Case 3, the wall 40 that is the second obstacle is present. In Case 2, the second obstacle is not present. As can be seen from these cases, the driving assistance device 100 relaxes execution conditions of the steering assistance for detouring around the moving object (in this case, the pedestrian 20) in the case where the second obstacle is present rather than in the case where the second obstacle is not present. Thus, it is possible to avoid collision with the moving object coming out in front of the target vehicle 10 by necessary operation of the steering assistance while suppressing occupant's annoyance due to unnecessary operation of the steering assistance.

Figure 2:
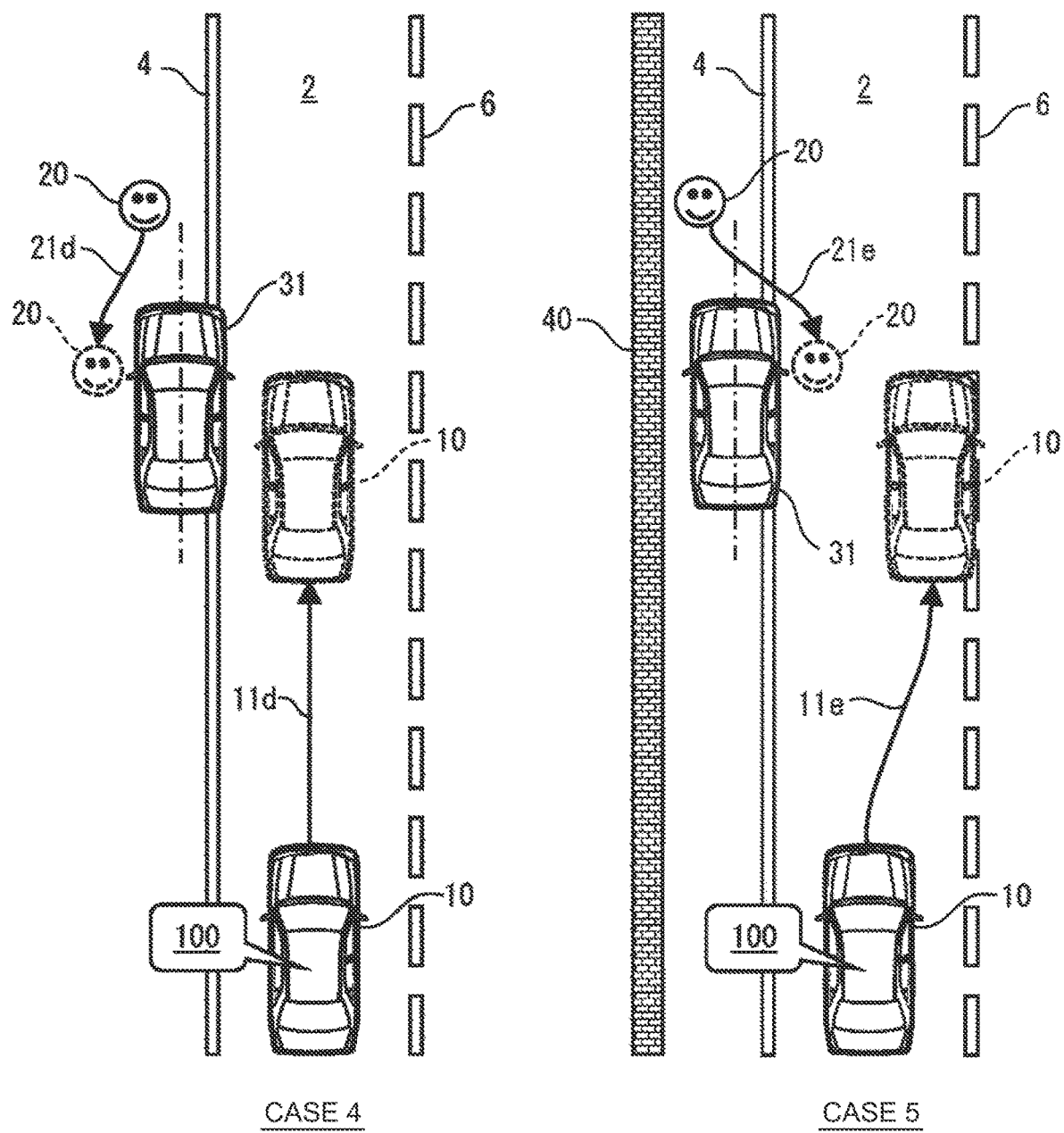
FIG. 2 is a diagram illustrating the outline of the driving assistance control of the present disclosure.

Next, the example of the driving assistance control shown in FIG. 2 will be described. In the example shown in FIG. 2, the pedestrian 20 is walking on the outer side of the side strip 4 in a direction opposite to the moving direction of the target vehicle 10. The parked vehicle 31 that is the first obstacle (longitudinal obstacle) for the pedestrian 20 is present on the outer side of the side strip 4 ahead of the pedestrian 20 in his/her moving direction. FIG. 2 shows Case 4 where only the parked vehicle 31 that is the first obstacle is present and no second obstacle is present, and Case 5 where the wall 40 that is the second obstacle is present in addition to the parked vehicle 31.

In Case 4, the pedestrian 20 is located opposite to the traveling lane 2 with respect to the center of the parked vehicle 31 in the lateral direction. Therefore, the pedestrian 20 may select the detour route along the outer side with a high possibility, and is predicted to move along a course 21d. Therefore, in Case 4, the driving assistance device 100 does not perform the steering assistance for detouring around the pedestrian 20. The driving assistance device 100 operates the vehicle actuators so that the target vehicle 10 travels along a target trajectory 11d passing through the center of the traveling lane 2.

The positional relationship between the pedestrian 20 and the parked vehicle 31 in Case 5 is the same as the positional relationship in Case 4. In Case 5, the wall 40 that is the second obstacle is located near the parked vehicle 31, and the pedestrian 20 is forced to move in the lateral direction toward the traveling lane 2 and therefore predicted to move along a course 21e. Thus, in Case 5, the driving assistance device 100 performs steering assistance for the target vehicle 10 to detour around the pedestrian 20. Specifically, the driving assistance device 100 generates a target trajectory 11e for detouring around the expected course 21e of the pedestrian 20, and operates the vehicle actuators so that the target vehicle 10 travels along the target trajectory 11e.

In Cases 4 and 5, the moving object is present in front of the first obstacle when viewed from the target vehicle 10, and moves toward the target vehicle 10 while detouring around the first obstacle. In these cases as well, the driving assistance device 100 relaxes the execution conditions of the steering assistance for detouring around the moving object in the case where the second obstacle is present rather than in the case where the second obstacle is not present. Thus, it is possible to avoid collision with the moving object coming out in front of the target vehicle 10.

Next, the example of the driving assistance control shown in FIG. 3 will be described. In the example shown in FIG. 3, the pedestrian 20 who is the moving object is walking on the outer side of the side strip 4 in the same direction as the moving direction of the target vehicle 10. A utility pole 32 is present on the outer side of the side strip 4 ahead of the pedestrian 20 in his/her moving direction. The utility pole 32 also corresponds to the longitudinal obstacle that hinders the pedestrian 20 from moving in the longitudinal direction, that is, the first obstacle. In this example, the moving direction of the moving object and the moving direction of the vehicle 10 are the same. As in the example shown in FIG. 2, the moving object may be present in front of the first obstacle when viewed from the target vehicle 10 and move in a direction opposite to the moving direction of the target vehicle 10.

The routes of the pedestrian 20 to detour around the utility pole 32 to move forward include a detour route along the inner side of the utility pole 32 and a detour route along the outer side of the utility pole 32. Compared with the parked vehicle 31 in Cases 1 to 5, the utility pole 32 is narrow in width and short in depth. The depth is a depth viewed from the pedestrian 20 and means a length in the longitudinal direction. Therefore, there is no difference in the walking distance of the pedestrian 20 regardless of whether the pedestrian 20 selects the detour route along the inner side or the detour route along the outer side. Even if the detour route along the inner side is selected, the pedestrian 20 walks in the traveling lane 2 during a very short period. Therefore, the pedestrian 20 may have less psychological resistance to the selection of the detour route along the inner side of the utility pole 32 compared with the case of detouring along the inner side of the parked vehicle 31.

Examples of the longitudinal obstacle that is narrow in width and short in depth as in the case of the utility pole 32 include signage, posts, and abandoned bicycles. A person standing still in one place may also be regarded as the longitudinal obstacle such as the utility pole 32. The longitudinal obstacle having a large width or depth, such as the parked vehicle 31, is defined as a first type longitudinal obstacle, and the longitudinal obstacle having a small width and depth, such as the utility pole 32, is defined as a second type longitudinal obstacle. Whether the obstacle is the first type longitudinal obstacle or the second type longitudinal obstacle may be determined from the name of the object recognized by object recognition. Alternatively, a specified value may be provided for the size of the longitudinal obstacle and whether the obstacle is the first type longitudinal obstacle or the second type longitudinal obstacle may be determined based on whether the size of the detected longitudinal obstacle is larger than the specified value. In that case, the specified value may be changed depending on an effective sidewalk width such as a width from the side strip 4 to the wall 40. Alternatively, a specified value may be provided for each of the width and depth and determination may be made that the obstacle is the first type longitudinal obstacle when at least one of the width and depth is larger than the specified value.

Figure 3:
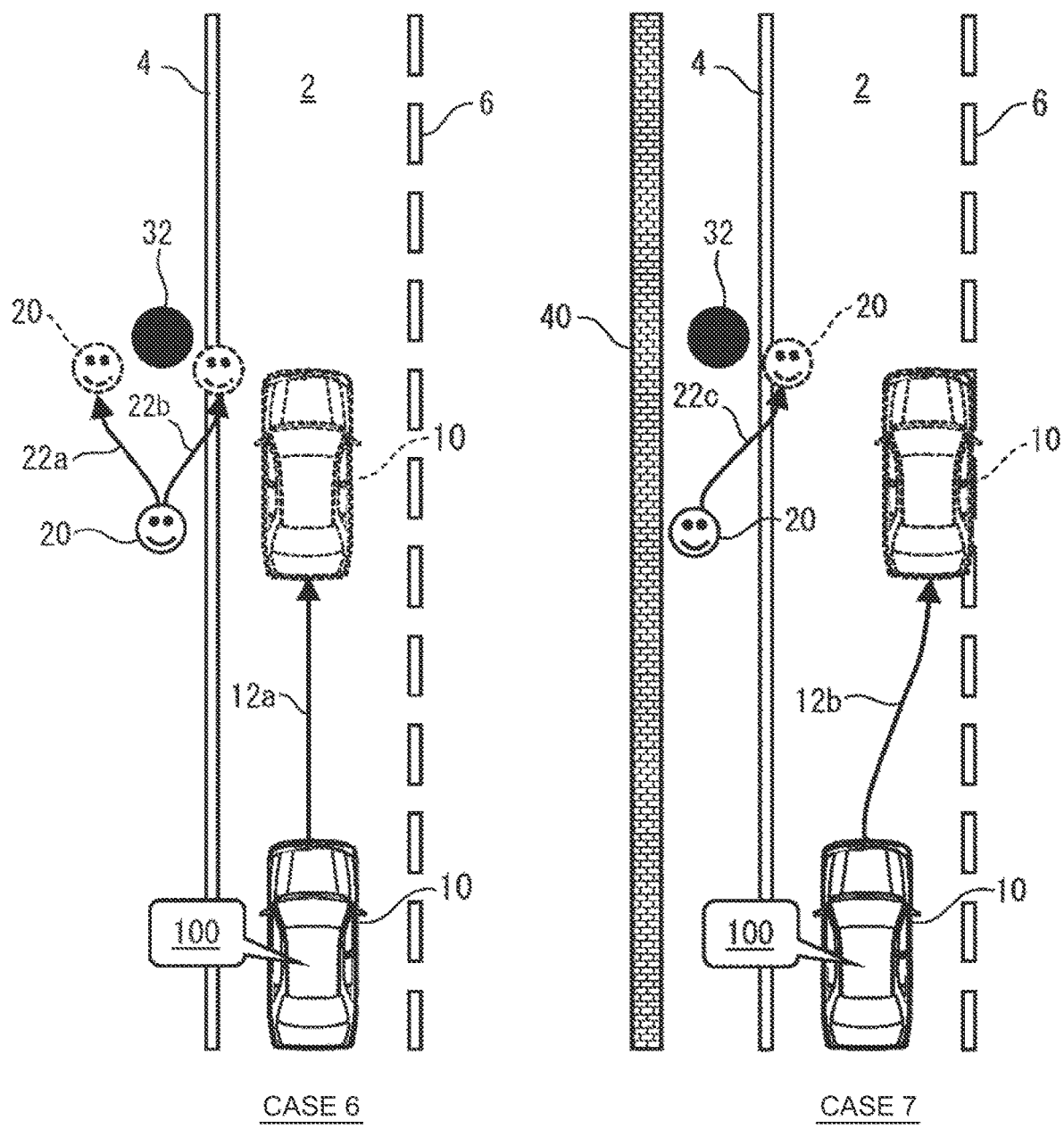
FIG. 3 is a diagram illustrating the outline of the driving assistance control of the present disclosure.

FIG. 3 shows Case 6 where only the utility pole 32 that is the first obstacle is present and no second obstacle is present, and Case 7 where the wall 40 that is the second obstacle is present in addition to the utility pole 32. The driving assistance control of the driving assistance device 100 will be described below for each case.

In Case 6, the pedestrian 20 is located at substantially the same position as that of the utility pole 32 in the lateral direction. In this case, the pedestrian 20 may select the detour route along the inner side of the utility pole 32 or may select the detour route along the outer side of the utility pole 32. Even if the position of the pedestrian 20 with respect to the utility pole 32 in the lateral direction deviates toward the traveling lane 2 or to a side opposite to the traveling lane 2, the route selected by the pedestrian 20 is not determined uniquely. That is, in Case 6, whether the pedestrian 20 will move along a course 22a or a course 22b cannot be predicted.

When the steering assistance for detouring around the pedestrian 20 is performed though the pedestrian 20 has selected the course 22a, the occupant feels annoyed. Assuming that the possibility of selection of the course 22a by the pedestrian 20 is about a half, the occupant feels annoyed at a considerable frequency. Therefore, in Case 6, the driving assistance device 100 does not perform the steering assistance for detouring around the pedestrian 20. The driving assistance device 100 operates the vehicle actuators so that the target vehicle 10 travels along a target trajectory 12a passing through the center of the traveling lane 2.

The positional relationship between the pedestrian 20 and the utility pole 32 in Case 7 is the same as the positional relationship in Case 6. In Case 7, the wall 40 is present near the utility pole 32. It is assumed that the clearance between the wall 40 and the utility pole 32 is a width that the pedestrian 20 cannot or hesitates to pass. In that case, the pedestrian 20 is forced to move in the lateral direction toward the traveling lane 2 due to collaboration of the action of the utility pole 32 for hindering the pedestrian 20 from moving in the longitudinal direction and the action of the wall 40 for hindering the pedestrian 20 from moving away from the traveling lane 2.

In Case 7, the pedestrian 20 is inevitably forced to select the detour route along the inner side of the utility pole 32. Therefore, the pedestrian 20 is predicted to move along a course 22c. Thus, in Case 7, the driving assistance device 100 performs steering assistance for the target vehicle 10 to detour around the pedestrian 20. Specifically, the driving assistance device 100 generates a target trajectory 12b for detouring around the expected course 22c of the pedestrian 20, and operates the vehicle actuators so that the target vehicle 10 travels along the target trajectory 12b.

In Cases 6 and 7, the first obstacle is the longitudinal obstacle having a small width and depth, and the route of the moving object for detouring around the first obstacle is not determined regardless of the position of the moving object with respect to the first obstacle in the lateral direction. In these cases as well, the driving assistance device 100 relaxes the execution conditions of the steering assistance for detouring around the moving object in the case where the second obstacle is present rather than in the case where the second obstacle is not present. Thus, it is possible to avoid collision with the moving object coming out in front of the target vehicle 10.

Figure 4:
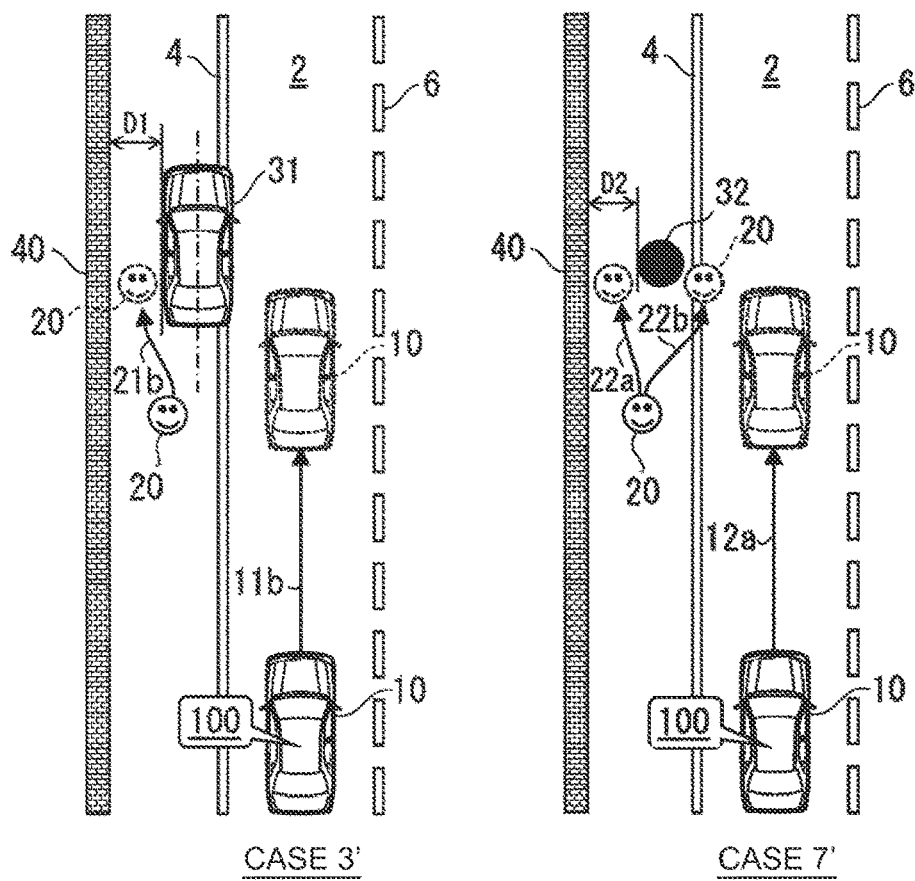
FIG. 4 is a diagram illustrating the outline of the driving assistance control of the present disclosure.

Referring to FIG. 4, description will be given of cases where a lateral obstacle is present but does not correspond to the second obstacle. FIG. 4 shows Case 3' where the lateral obstacle that does not correspond to the second obstacle is present together with the first type longitudinal obstacle, and Case 7' where the lateral obstacle that does not correspond to the second obstacle is present together with the second type longitudinal obstacle.

In Case 3', the wall 40 is present opposite to the traveling lane 2 with respect to the parked vehicle 31 in the lateral direction. The wall 40 hinders the pedestrian 20 from moving away from the traveling lane 2. A distance D1 from the parked vehicle 31 to the wall is sufficiently large for the pedestrian 20. Therefore, the pedestrian 20 can pass through a space between the parked vehicle 31 and the wall 40. Thus, the pedestrian 20 is not forced to move in the lateral direction toward the traveling lane 2. Accordingly, the wall 40 in Case 3' is the lateral obstacle but does not correspond to the second obstacle defined herein. Whether the obstacle corresponds to the second obstacle is determined based on whether the measured distance D1 is smaller than a lower limit value. The lower limit value is, for example, a width that the pedestrian 20 cannot pass or a width at which the pedestrian 20 is determined to have a low possibility of passage. The lower limit value may statistically be determined based on an average width of the pedestrian 20.

The parked vehicle 31 is the first type longitudinal obstacle. Therefore, when the pedestrian 20 is located on a left side of the center of the parked vehicle 31 in the lateral direction, the pedestrian 20 may select the detour route along the outer side of the parked vehicle 31 with a high possibility as in Case 2. That is, in case 3', the pedestrian 20 is predicted to move along the course 21b. Therefore, the driving assistance device 100 does not perform the steering assistance for detouring around the pedestrian 20, and causes the target vehicle 10 to travel along the target trajectory 11b passing through the center of the traveling lane 2.

In Case 7', the wall 40 is present opposite to the traveling lane 2 with respect to the utility pole 32 in the lateral direction. The wall 40 hinders the pedestrian 20 from moving away from the traveling lane 2. A distance D2 from the utility pole 32 to the wall 40 is sufficiently large for the pedestrian 20. Therefore, the pedestrian 20 can pass through a space between the utility pole 32 and the wall 40. Thus, the pedestrian 20 is not forced to move in the lateral direction toward the traveling lane 2. Accordingly, the wall 40 in Case 7' is the lateral obstacle but does not correspond to the second obstacle defined herein. Whether the obstacle corresponds to the second obstacle is determined based on whether the measured distance D2 is smaller than a lower limit value. The lower limit value for the distance D1 and the lower limit value for the distance D2 may each be a fixed value or a value obtained by adding a predetermined margin to the width of the moving object (in this case, the pedestrian 20). Comparing the case of passing through the space between the parked vehicle 31 and the wall 40 and the case of passing through the space between the utility pole 32 and the wall 40, the pedestrian 20 tends to feel psychologically narrower in the former case. Therefore, the lower limit value for the distance D1 may be set larger regarding the lower limit value for the distance D1 and the lower limit value for the distance D2.

The utility pole 32 is the second type longitudinal obstacle. Therefore, as in Case 6, the route of the pedestrian 20 for detouring around the utility pole 32 is not uniquely determined regardless of the position of the pedestrian 20 with respect to the utility pole 32. That is, in Case 7', whether the pedestrian 20 will move along the course 22a or the course 22b cannot be predicted. Therefore, the driving assistance device 100 does not perform the steering assistance for detouring around the pedestrian 20, and causes the target vehicle 10 to travel along the target trajectory 12a passing through the center of the traveling lane 2.

2. Driving Assistance Control of First Embodiment 2-1. Examples of Application to Cases 1 to 7

Specific embodiments of the driving assistance control will be described. In driving assistance control according to a first embodiment, an assistance execution area is set with the first obstacle serving as a base point. The assistance execution area is an area that extends toward the moving object from the first obstacle in the longitudinal direction. When the moving object is located within the assistance execution area, the driving assistance device 100 performs steering assistance for the target vehicle 10. In the first embodiment, the assistance execution area is expanded as a method for relaxing the execution conditions of the steering assistance for detouring around the moving object. Details of the assistance execution area can be described by using Cases 1 to 7. The driving assistance control according to the first embodiment will be described below for each of the above cases.

Figure 5:
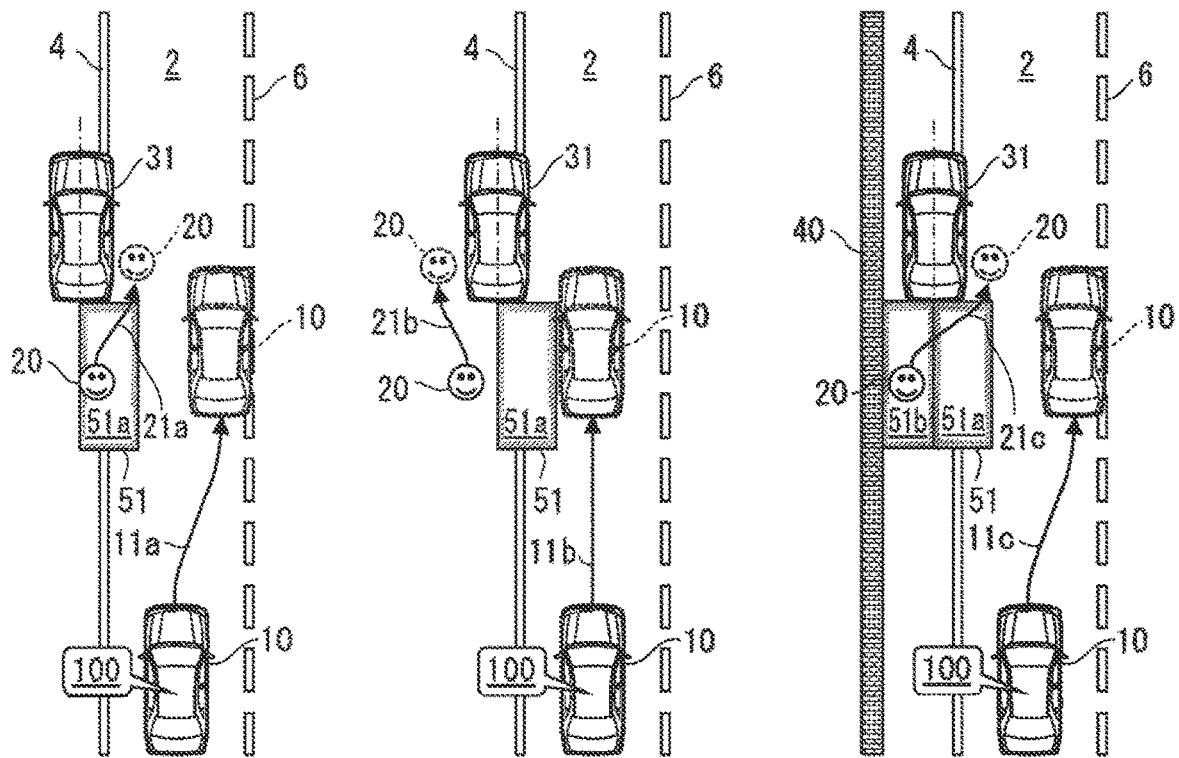
FIG. 5 is a diagram illustrating driving assistance control according to a first embodiment of the present disclosure.

FIG. 5 shows examples of application of the driving assistance control according to the first embodiment to Cases 1 to 3. In Cases 1 and 2, only the parked vehicle 31 that is the first obstacle is present around the pedestrian 20 and no second obstacle is present. In Case 3, the wall 40 that is the second obstacle is present in addition to the first obstacle. In response to detection of the pedestrian 20 and the parked vehicle 31, the driving assistance device 100 sets an assistance execution area 51 extending toward the pedestrian in the longitudinal direction with the parked vehicle 31 serving as a base point.

In Cases 1 and 2, a right area (first area) 51a that extends from the center of the parked vehicle 31 toward the traveling lane 2 in the lateral direction is set as the assistance execution area 51. The right area 51a has, for example, a rectangular shape. The width of the right area 51a may be a fixed value that is not related to the size of the first obstacle, or may be set based on the size of the first obstacle. For example, the width of the right area 51a may be set to a width larger by a predetermined margin than a distance from the center to the right end of the first obstacle in the lateral direction. The length of the right area 51a in the longitudinal direction may also be a fixed value that is not related to the size of the first obstacle, or may be set based on the size of the first obstacle. For example, when the width of the right area 51a is set larger as the width of the first obstacle increases, the length of the right area 51a in the longitudinal direction may be set larger as the width of the right area 51a increases.

In Case 1, the pedestrian 20 is walking near the traveling lane 2 with respect to the center of the parked vehicle 31 in the lateral direction. The walking position of the pedestrian 20 is within the assistance execution area 51. Therefore, the driving assistance device 100 performs steering assistance for the target vehicle 10 to detour around the pedestrian 20. Specifically, the driving assistance device 100 generates the target trajectory 11a offset from the center of the traveling lane 2 toward the lane boundary line 6, and operates a steering actuator so that the target vehicle 10 travels along the target trajectory 11a. The amount of offset of the target trajectory from the center of the traveling lane 2 when the steering assistance is performed may be a fixed value or set based on the position and speed of the pedestrian 20. When the pedestrian 20 moves out of the assistance execution area 51 to the right side, that is, when the pedestrian 20 enters the traveling lane 2 further inward, the driving assistance device 100 operates a braking actuator and a drive actuator to stop the target vehicle 10.

In Case 2, the pedestrian 20 is walking opposite to the traveling lane 2 with respect to the center of the parked vehicle 31 in the lateral direction. The walking position of the pedestrian 20 is outside the assistance execution area 51 set from the center of the parked vehicle 31 toward the traveling lane 2 in the lateral direction. Therefore, the driving assistance device 100 does not perform the steering assistance for detouring around the pedestrian 20, and the target vehicle 10 travels along the target trajectory 11b passing through the center of the traveling lane 2. Thus, it is possible to suppress annoyance of the occupant of the target vehicle 10 due to intervention of unnecessary steering assistance.

In Case 3, the assistance execution area 51 is expanded from the near side to the far side of the traveling lane 2 in the lateral direction. Specifically, an area obtained by combining the right area 51a and a left area (second area) 51b that extends from the center of the parked vehicle 31 to a side opposite to the traveling lane 2 in the lateral direction is set as the assistance execution area 51. The left area 51b has, for example, a rectangular shape. The width of the left area 51b is a width from the center of the first obstacle in the lateral direction to the second obstacle. In the example shown in FIG. 5, the width from the center of the parked vehicle 31 to the wall 40 is the width of the left area 51b. The length of the left area 51b in the longitudinal direction is set equal to the length of the right area 51a in the longitudinal direction. The length in the longitudinal direction may be different between the left area 51b and the right area 51a.

In Case 3, the walking position of the pedestrian 20 is opposite to the traveling lane 2 with respect to the center of the parked vehicle 31 in the lateral direction. By adding the left area 51b to the assistance execution area 51, the walking position of the pedestrian 20 is within the assistance execution area 51. Therefore, the driving assistance device 100 performs steering assistance for detouring around the pedestrian 20, and generates the target trajectory 11c offset from the center of the traveling lane 2 toward the lane boundary line 6. In Case 3 where the wall 40 that is the second obstacle is present, the execution conditions of the steering assistance for detouring around the pedestrian 20 are relaxed compared with Case 2 where the wall 40 is not present. Thus, it is possible to avoid collision between the pedestrian 20 and the target vehicle 10 in the situation where the pedestrian 20 may come out in front of the target vehicle 10 with a higher possibility.

Figure 6:
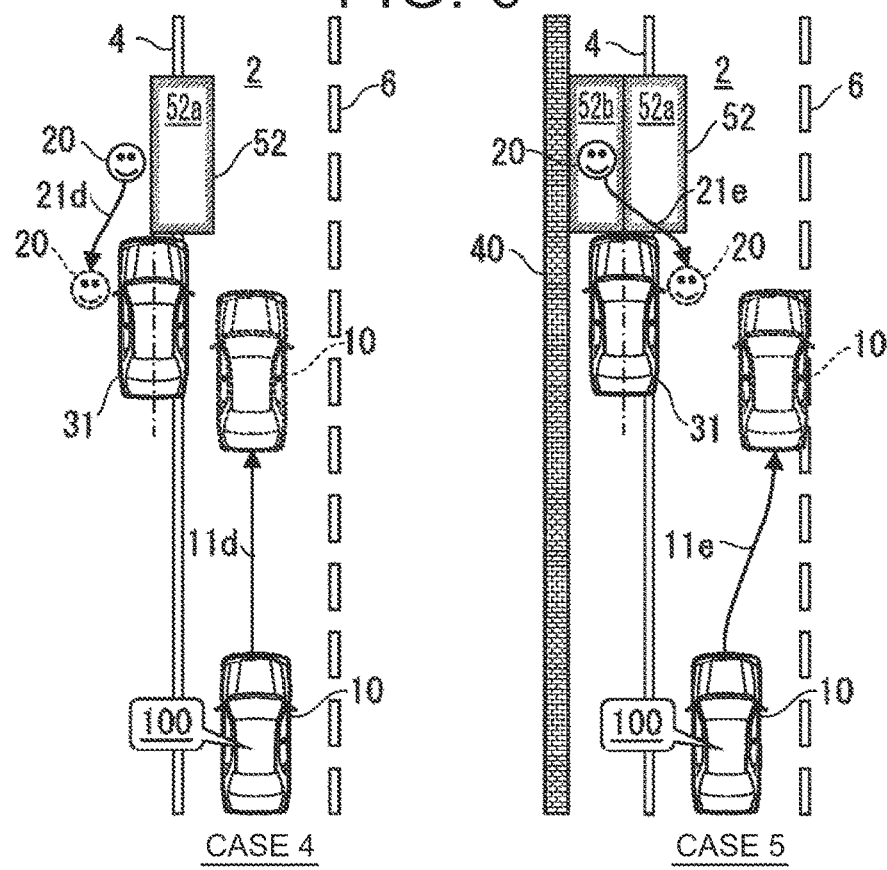
FIG. 6 is a diagram illustrating the driving assistance control according to the first embodiment of the present disclosure.

FIG. 6 shows examples of application of the driving assistance control according to the first embodiment to Cases 4 and 5. In Cases 4 and 5, the pedestrian 20 walks in a direction opposite to the moving direction of the target vehicle 10 and approaches the parked vehicle 31 that is the first obstacle.

In Cases 4 and 5, an assistance execution area 52 is set opposite to the target vehicle 10 with respect to the parked vehicle 31 in the longitudinal direction. Since no second obstacle is present in Case 4, a right area (first area) 52a that extends from the center of the parked vehicle 31 toward the traveling lane 2 in the lateral direction is set as the assistance execution area 52. Since the wall 40 that is the second obstacle is present in Case 5, the assistance execution area 52 is expanded from the near side to the far side of the traveling lane 2 in the lateral direction. Specifically, an area obtained by combining the right area 52a and a left area (second area) 52b that extends from the center of the parked vehicle 31 to a side opposite to the traveling lane 2 in the lateral direction is set as the assistance execution area 52. The concept of the shapes and sizes of the left area and the right area in Cases 1 to 3 is applied to the concept of the shapes and sizes of the left area 52b and the right area 52a.

In Case 4, the walking position of the pedestrian 20 is outside the assistance execution area 52. Therefore, the driving assistance device 100 does not perform the steering assistance for detouring around the pedestrian 20, and the target vehicle 10 travels along the target trajectory 11d passing through the center of the traveling lane 2. In Case 5, the walking position of the pedestrian 20 is within the assistance execution area 52. Therefore, the driving assistance device 100 performs steering assistance for detouring around the pedestrian 20, and generates the target trajectory 11e offset from the center of the traveling lane 2 toward the lane boundary line 6.

In Cases 4 and 5, the assistance execution area 52 is set on the same side as the position of the pedestrian 20 with respect to the parked vehicle 31 in the longitudinal direction. The same applies to Cases 1 to 3. In Cases 1 to 3 as well, the assistance execution area 51 is set on the same side as the position of the pedestrian 20 with respect to the parked vehicle 31 in the longitudinal direction. That is, in Cases 1 to 5, the assistance execution area is set depending on the position of the pedestrian 20 with respect to the parked vehicle 31. When an entity such as the parked vehicle 31 that may be the first obstacle is detected, assistance execution areas may be set on both sides of the entity in the longitudinal direction. For example, the right areas 51a and 52a may be set when only the parked vehicle 31 is detected, and the left areas 51b and 52b may be set in addition to the right areas 51a and 52a when the parked vehicle 31 and the wall 40 are detected.

Figure 7:
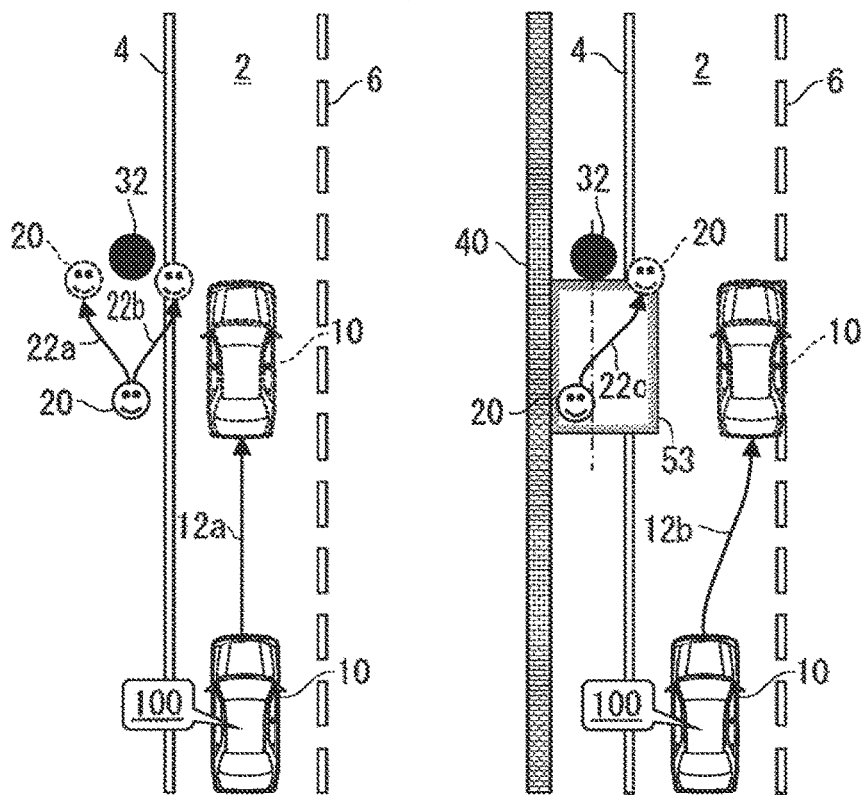
FIG. 7 is a diagram illustrating the driving assistance control according to the first embodiment of the present disclosure.

FIG. 7 shows examples of application of the driving assistance control according to the first embodiment to Cases 6 and 7. In Cases 6 and 7, the first obstacle is the longitudinal obstacle such as the utility pole 32 that is narrow in width and short in depth. In these cases, the assistance execution area is set by a method different from those in Cases 1 to 5.

In Case 6, no assistance execution area is set. This is because whether the pedestrian 20 will move along the course 22a or the course 22b cannot be predicted regardless of the position of the pedestrian 20 with respect to the utility pole 32. Therefore, in Case 6, the driving assistance device 100 does not perform the steering assistance for detouring around the pedestrian 20 regardless of the walking position of the pedestrian 20, and the target vehicle 10 travels along the target trajectory 12a passing through the center of the traveling lane 2. Thus, it is possible to suppress annoyance of the occupant of the target vehicle 10 due to intervention of unnecessary steering assistance.

In Case 7, an assistance execution area 53 is set near the target vehicle 10 with respect to the utility pole 32 in the longitudinal direction. This is because the course of the pedestrian 20 is limited to the detour course 22c along the inner side of the utility pole 32 due to the presence of the wall 40 that is the second obstacle regardless of the position of the pedestrian 20 with respect to the utility pole 32. The assistance execution area 53 extends within a range from the wall 40 to at least the side strip 4 in the lateral direction. The right end of the assistance execution area 53 may enter the traveling lane 2 across the side strip 4. The length of the assistance execution area 53 in the longitudinal direction may be set to, for example, a fixed value.

Since the moving direction is limited by the utility pole 32 and the wall 40 in Case 7, the walking position of the pedestrian 20 is within the assistance execution area 53. Therefore, the driving assistance device 100 performs steering assistance for detouring around the pedestrian 20, and generates the target trajectory 12b offset from the center of the traveling lane 2 toward the lane boundary line 6. In Case 7 where the wall 40 that is the second obstacle is present, the execution conditions of the steering assistance for detouring around the pedestrian 20 are relaxed compared with Case 6 where the wall 40 is not present. Thus, it is possible to avoid collision between the pedestrian 20 and the target vehicle 10 in the situation where the pedestrian 20 may come out in front of the target vehicle 10 with a higher possibility.

2-2. Procedure of Driving Assistance Control

Figure 8:
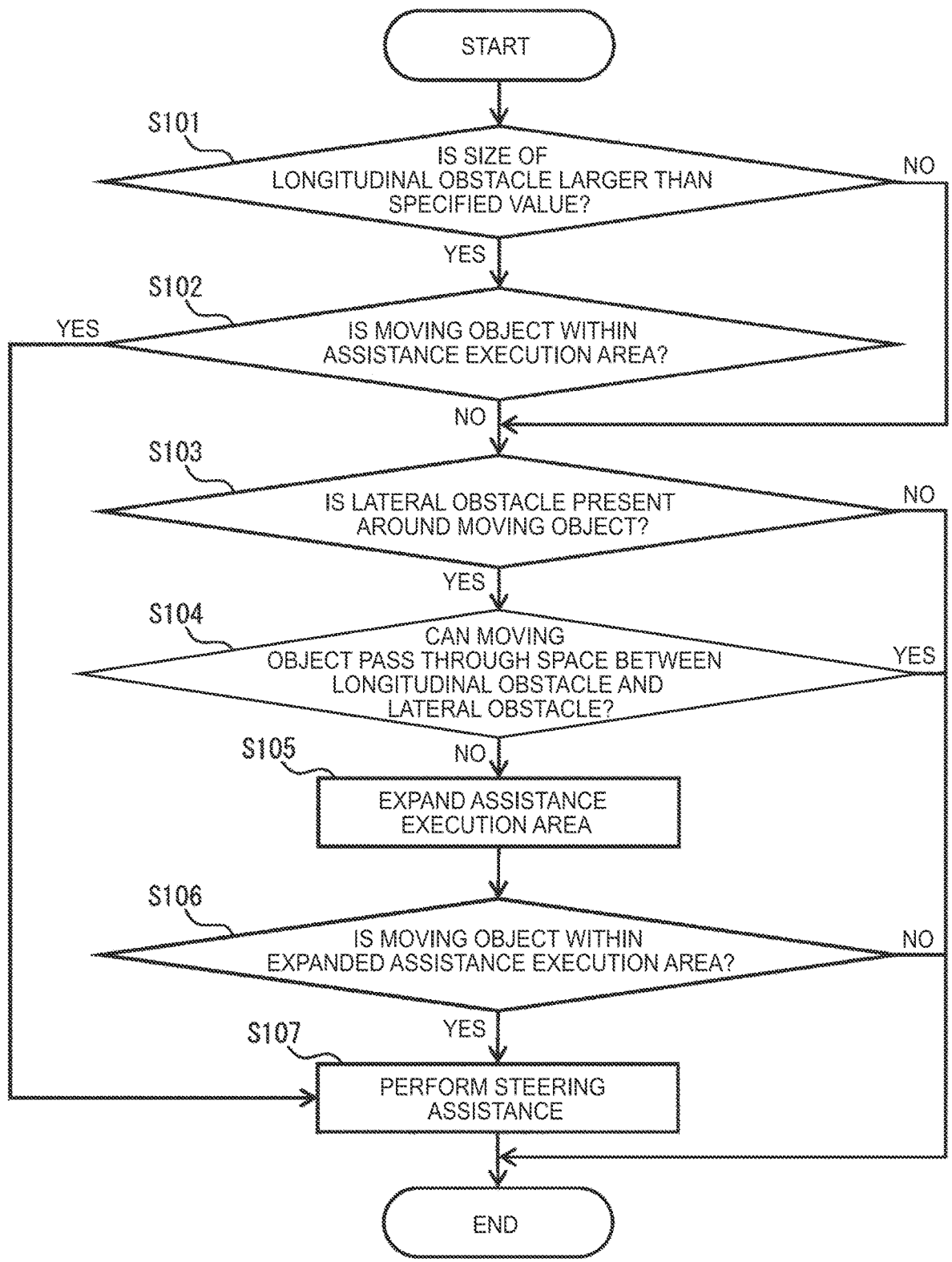
FIG. 8 is a flowchart showing a procedure of the driving assistance control according to the first embodiment of the present disclosure.

The driving assistance device 100 performs the driving assistance control in accordance with a procedure shown in FIG. 8. FIG. 8 is a flowchart showing the procedure of the driving assistance control to be performed by the driving assistance device 100 in the first embodiment. The process in the flowchart shown in FIG. 8 is performed when a moving object is detected ahead of the target vehicle 10 and a longitudinal obstacle (first obstacle) that hinders the moving object from moving in the longitudinal direction is detected.

In step S101 of the flowchart shown in FIG. 8, determination is made as to whether the size of the longitudinal obstacle is larger than the specified value. When the size of the longitudinal obstacle is larger than the specified value, determination is made that the longitudinal obstacle is the first type longitudinal obstacle. When the size of the longitudinal obstacle is equal to or smaller than the specified value, determination is made that the longitudinal obstacle is the second type longitudinal obstacle.

When the longitudinal obstacle is the first type longitudinal obstacle, the process proceeds to step S102. In step S102, determination is made as to whether the moving object is within the assistance execution area set with the longitudinal obstacle serving as the base point. Since the longitudinal obstacle is the first type longitudinal obstacle, the right area near the traveling lane with respect to the longitudinal obstacle in the lateral direction is set as the assistance execution area.

When the moving object is within the assistance execution area, the process proceeds to step S107. In step S107, steering assistance for detouring around the moving object is performed. Case 1 is included in cases where the result of the determination in step S102 is positive and the steering assistance is performed.

When the moving object is not within the assistance execution area, the process proceeds to step S103. When the longitudinal obstacle is the second type longitudinal obstacle, the process skips step S102 and proceeds to step S103. In step S103, determination is made as to whether a lateral obstacle is present around the moving object. When no lateral obstacle is present, the steering assistance for detouring around the moving object is not performed. Cases 2, 4, and 6 are included in cases where the result of the determination in step S103 is negative and the steering assistance is not performed.

When a lateral obstacle is present, the process proceeds to step S104. In step S104, determination is made as to whether the moving object can pass through a space between the longitudinal obstacle and the lateral obstacle. When the moving object can pass through the space between the longitudinal obstacle and the lateral obstacle, the lateral obstacle does not correspond to the second obstacle. In this case, the steering assistance for detouring around the moving object is not performed. Cases 3' and 7' are included in cases where the result of the determination in step S104 is positive and the steering assistance is not performed.

When the moving object cannot pass through the space between the longitudinal obstacle and the lateral obstacle, the lateral obstacle corresponds to the second obstacle. In this case, the process proceeds to step S105. In step S105, the assistance execution area is expanded. When the longitudinal obstacle is the first type longitudinal obstacle, the left area opposite to the traveling lane with respect to the longitudinal obstacle in the lateral direction is added to the assistance execution area. When the longitudinal obstacle is the second type longitudinal obstacle, the assistance execution area is set for the first time. Cases 3, 5, and 7 are included in cases where the result of the determination in step S104 is negative.

In step S106, determination is made as to whether the moving object is within the expanded assistance execution area. When the moving object is not within the expanded assistance execution area, the steering assistance for detouring around the moving object is not performed. When the moving object is within the expanded assistance execution area, the process proceeds to step S107. In step S107, the steering assistance for detouring around the moving object is performed. Cases 3, 5, and 7 are included in cases where the result of the determination in step S106 is positive and the steering assistance is performed.

2-3. Configuration of Driving Assistance Device

Figure 9:
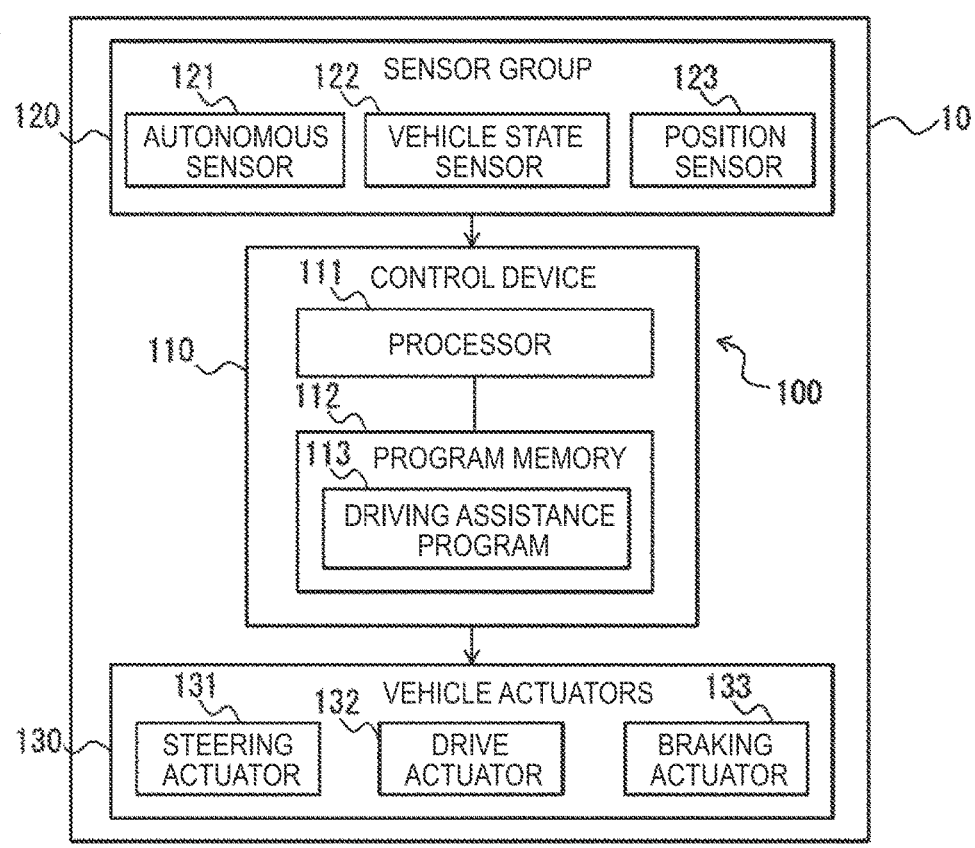
FIG. 9 is a block diagram illustrating a configuration of a driving assistance device according to the first embodiment of the present disclosure.

Lastly, description will be given of the configuration of the driving assistance device 100 for performing the driving assistance control. FIG. 9 is a diagram showing a configuration example of the driving assistance device 100 according to the first embodiment and the vehicle 10 to which it is applied. The vehicle 10 includes a control device 110 that controls the vehicle 10, a sensor group 120 that inputs information to the control device 110, and vehicle actuators 130 that operate in response to signals output from the control device 110. The control device 110, the sensor group 120, and the vehicle actuators 130 are connected by an in-vehicle network such as a controller area network (CAN). The driving assistance device 100 includes at least the control device 110. The driving assistance device 100 may include the sensor group 120 in addition to the control device 110. The driving assistance device 100 may further include the vehicle actuators 130.

The sensor group 120 includes an autonomous sensor 121, a vehicle state sensor 122, and a position sensor 123. The autonomous sensor 121 acquires information on a situation around the vehicle 10, including an area ahead of the vehicle 10. The autonomous sensor 121 includes at least one of a camera, a millimeter-wave radar, and a laser imaging, detection, and ranging (LiDAR) sensor. Processes such as detection of objects around the vehicle 10, measurement of relative positions and relative speeds of the detected objects to the vehicle 10, and recognition of the shapes of the detected objects are performed based on the information obtained by the autonomous sensor 121. The moving object, the longitudinal obstacle, and the lateral obstacle ahead of the vehicle 10 are detected by the autonomous sensor 121.

The vehicle state sensor 122 acquires information on motion of the vehicle 10. The vehicle state sensor 122 includes at least one of, for example, a wheel speed sensor, an acceleration sensor, a yaw rate sensor, and a steering angle sensor. The position sensor 123 is used to acquire information on a current position of the vehicle 10. Examples of the position sensor 123 include a global positioning system (GPS) receiver. When the driving assistance device 100 has high-accuracy map information, obstacles around the vehicle 10 can be recognized based on the high-accuracy map information and the current position of the vehicle 10 acquired by the position sensor 123. For example, information on obstacles fixed on the map, such as utility poles and walls, may be acquired from the high-accuracy map information instead of by the autonomous sensor 121.

The vehicle actuators 130 control the motion of the vehicle 10. The vehicle actuators 130 include a steering actuator 131 that steers the vehicle 10, a drive actuator 132 that drives the vehicle 10, and a braking actuator 133 that brakes the vehicle 10. Examples of the steering actuator 131 include a power steering system, a steer-by-wire steering system, and a rear wheel steering system. Examples of the drive actuator 132 include an engine, a motor, and a hybrid system. Examples of the braking actuator 133 include a hydraulic brake and a regenerative brake.

The control device 110 is an on-board computer typified by an electronic control unit (ECU). The control device 110 includes a processor 111 and a program memory 112 coupled to the processor 111. The processor 111 may be, for example, a central processing unit (CPU), a field-programmable gate array (FPGA), an application-specific integrated circuit (ASIC), or any other processing unit. The processor 111 may be a combination of two or more of the CPU, the FPGA, the ASIC, and the other processing unit.

The program memory 112 stores a driving assistance program 113 including a plurality of executable instructions. The driving assistance program 113 causes the processor 111 to perform the driving assistance control shown in the flowchart of FIG. 8. The driving assistance program 113 can be recorded on a computer-readable recording medium. The control device 110 includes a storage (not shown) that stores various types of data for driving assistance, including map information.

3. Driving Assistance Control of Second Embodiment
3-1. Examples of Application to Cases 1 to 7

Next, a second embodiment of the present disclosure will be described. In driving assistance control according to the second embodiment, a predicted range of a future position of a moving object is calculated. To calculate the predicted range, the driving assistance device 100 calculates a presence probability of the moving object at each position on an XY plane at a time in the future with a predetermined time interval from a current time based on a current position, a moving direction, a moving speed, and a surrounding environment of the moving object. A position having a high presence probability can be regarded as a position having a high risk of collision with the target vehicle 10. When contour lines are generated by connecting a set of positions having the same presence probability, a contour line closer to the center has a higher presence probability, and a contour line on the outer side has a lower presence probability. The predicted range is herein defined as an area where the presence probability of the moving object is equal to or higher than a predetermined value.

In the driving assistance control according to the second embodiment, when the predicted range overlaps the trajectory of the target vehicle 10, the driving assistance device 100 performs steering assistance for the target vehicle 10. The predicted range is set near the traveling lane as a method for relaxing the execution conditions of the steering assistance for detouring around the moving object. Specific examples of the predicted range can be described by using Cases 1 to 7. The driving assistance control according to the second embodiment will be described below for each of the above cases.

Figure 10:
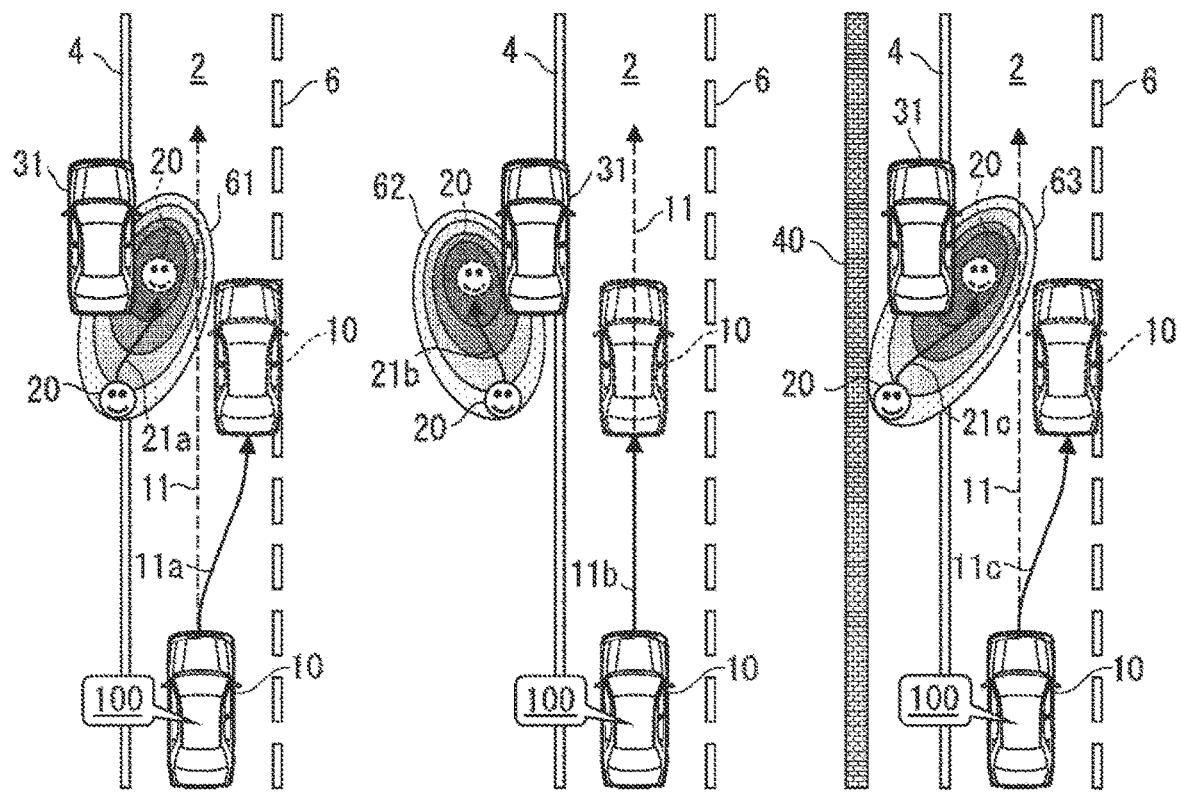
FIG. 10 is a diagram illustrating driving assistance control according to a second embodiment of the present disclosure.

FIG. 10 shows examples of application of the driving assistance control according to the second embodiment to Cases 1 to 3. In Cases 1 and 2, only the parked vehicle 31 that is the first obstacle is present around the pedestrian 20 and no second obstacle is present. In Case 3, the wall 40 that is the second obstacle is present in addition to the first obstacle.

In Case 1, a predicted range 61 of a future position of the pedestrian 20 extends from a current position of the pedestrian 20 to the right side of the parked vehicle 31, that is, toward the traveling lane 2. This is because the current position of the pedestrian is near the traveling lane 2 with respect to the center of the parked vehicle 31 in the lateral direction and therefore the pedestrian 20 may detour along the inner side of the parked vehicle 31 with a high possibility. The course 21a from the current position of the pedestrian to the center of the predicted range 61, that is, to the position having the highest presence probability is a predicted course to be selected by the pedestrian 20 to detour around the parked vehicle 31 in Case 1.

In Case 1, the predicted range 61 overlaps a current trajectory 11 of the target vehicle 10. Therefore, the driving assistance device 100 performs steering assistance for the target vehicle 10 to detour around the pedestrian 20. Specifically, the driving assistance device 100 generates the target trajectory 11a offset from the center of the traveling lane 2 toward the lane boundary line 6, and operates the steering actuator so that the target vehicle 10 travels along the target trajectory 11a. The amount of offset of the target trajectory from the center of the traveling lane 2 when the steering assistance is performed is set so that the target trajectory 11a does not overlap the predicted range 61. When there is no room to generate the target trajectory 11a that does not overlap the predicted range 61 because the predicted range 61 extends to the full traveling lane 2, the driving assistance device 100 operates the braking actuator and the drive actuator to stop the target vehicle 10.

In Case 2, a predicted range 62 of a future position of the pedestrian 20 extends from a current position of the pedestrian 20 to the left side of the parked vehicle 31, that is, opposite to the traveling lane 2. This is because the current position of the pedestrian is opposite to the traveling lane 2 with respect to the center of the parked vehicle 31 in the lateral direction and therefore the pedestrian 20 may detour along the outer side of the parked vehicle 31 with a high possibility. The course 21b from the current position of the pedestrian 20 to the center of the predicted range 62 is a predicted course to be selected by the pedestrian 20 to detour around the parked vehicle 31 in Case 2.

In Case 2, the predicted range 62 does not overlap the current trajectory 11 of the target vehicle 10. Therefore, the driving assistance device 100 does not perform the steering assistance for detouring around the pedestrian 20, and the target vehicle 10 travels along the target trajectory 11b passing through the center of the traveling lane 2. Thus, it is possible to suppress annoyance of the occupant of the target vehicle 10 due to intervention of unnecessary steering assistance.

In Case 3, the current position of the pedestrian 20 is opposite to the traveling lane 2 with respect to the center of the parked vehicle 31 in the lateral direction. A predicted range 63 of a future position of the pedestrian 20 extends from the current position of the pedestrian 20 to the right side of the parked vehicle 31. This is because the pedestrian is forced to move in the lateral direction toward the traveling lane 2 due to the collaborative action of the wall 40 and the parked vehicle 31. The course 21c from the current position of the pedestrian 20 to the center of the predicted range 63 is a predicted course to be selected by the pedestrian 20 to detour around the parked vehicle 31 in Case 3.

In Case 3, the predicted range 63 overlaps the current trajectory 11 of the target vehicle 10. Therefore, the driving assistance device 100 performs steering assistance for detouring around the pedestrian 20, and generates the target trajectory 11c offset from the center of the traveling lane 2 toward the lane boundary line 6 so that the target trajectory 11c does not overlap the predicted range 63. In Case 3 where the wall 40 that is the second obstacle is present, the execution conditions of the steering assistance for detouring around the pedestrian 20 are relaxed compared with Case 2 where the wall 40 is not present. Thus, it is possible to avoid collision between the pedestrian 20 and the target vehicle 10 in the situation where the pedestrian 20 may come out in front of the target vehicle 10 with a higher possibility.

Figure 11:
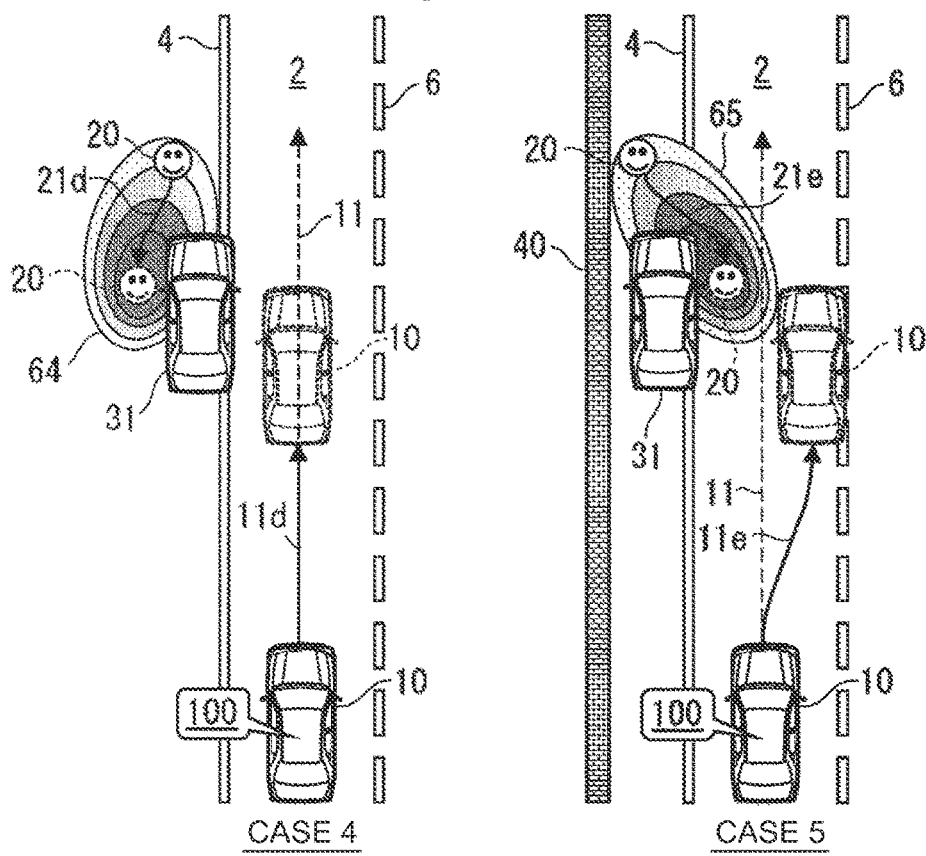
FIG. 11 is a diagram illustrating the driving assistance control according to the second embodiment of the present disclosure.

FIG. 11 shows examples of application of the driving assistance control according to the second embodiment to Cases 4 and 5. In Cases 4 and 5, the pedestrian 20 walks in a direction opposite to the moving direction of the target vehicle 10 and approaches the parked vehicle 31 that is the first obstacle.

In Cases 4 and 5, predicted ranges 64 and 65 of future positions of the pedestrian 20 extend opposite to the target vehicle 10 with respect to the parked vehicle 31 in the longitudinal direction. In Case 4, the predicted range 64 extends from the current position of the pedestrian 20 to the left side of the parked vehicle 31. In Case 5, the predicted range 65 extends from the current position of the pedestrian 20 to the right side of the parked vehicle 31. The reasons are as follows. In Case 4, the pedestrian 20 may detour along the outer side of the parked vehicle 31 with a high possibility. In Case 5, the pedestrian 20 is forced to move in the lateral direction toward the traveling lane 2 due to the collaborative action of the wall 40 and the parked vehicle 31.

In Case 4, the predicted range 64 does not overlap the current trajectory 11 of the target vehicle 10. Therefore, the driving assistance device 100 does not perform the steering assistance for detouring around the pedestrian 20, and the target vehicle 10 travels along the target trajectory 11d passing through the center of the traveling lane 2. In Case 5, the predicted range 65 overlaps the current trajectory 11 of the target vehicle 10. Therefore, the driving assistance device 100 performs steering assistance for detouring around the pedestrian 20, and generates the target trajectory 11e offset from the center of the traveling lane 2 toward the lane boundary line 6 so that the target trajectory 11e does not overlap the predicted range 65.

Figure 12:
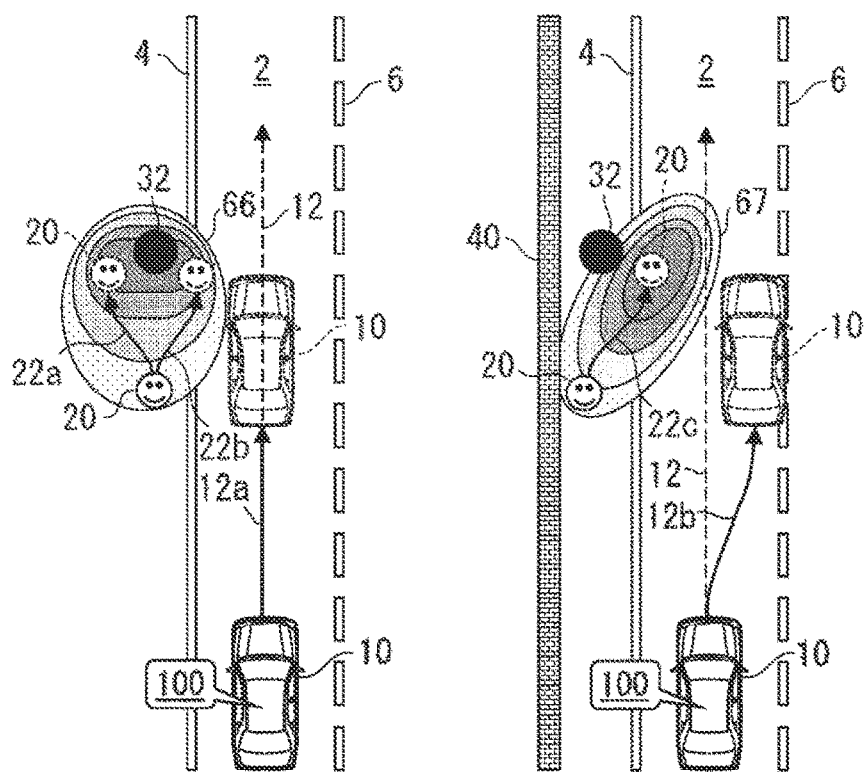
FIG. 12 is a diagram illustrating the driving assistance control according to the second embodiment of the present disclosure.

FIG. 12 shows examples of application of the driving assistance control according to the second embodiment to Cases 6 and 7. In Cases 6 and 7, the first obstacle is the longitudinal obstacle such as the utility pole 32 that is narrow in width and short in depth.

In Case 6, a predicted range 66 of a future position of the pedestrian 20 extends from a current position of the pedestrian 20 to both right and left sides of the utility pole 32. This is because whether the pedestrian 20 will detour along the inner side or the outer side of the utility pole 32 is not determined regardless of the position of the pedestrian 20 with respect to the utility pole 32. The predicted range 66 set in Case 6 does not overlap a current trajectory 12 of the target vehicle 10. Therefore, the driving assistance device 100 does not perform the steering assistance for detouring around the pedestrian 20 regardless of the walking position of the pedestrian 20, and the target vehicle 10 travels along the target trajectory 12a passing through the center of the traveling lane 2. Thus, it is possible to suppress annoyance of the occupant of the target vehicle 10 due to intervention of unnecessary steering assistance.

In Case 7, a predicted range 67 of a future position of the pedestrian 20 extends from the current position of the pedestrian 20 to the right side of the parked vehicle 31. This is because the pedestrian 20 is forced to move in the lateral direction toward the traveling lane 2 due to the collaborative action of the wall 40 and the parked vehicle 31 regardless of the position of the pedestrian 20 with respect to the utility pole 32. The course 22c from the current position of the pedestrian 20 to the center of the predicted range 67 is a predicted course to be selected by the pedestrian 20 to detour around the parked vehicle 31 in Case 7.

In Case 7, the predicted range 67 overlaps the current trajectory 12 of the target vehicle 10. Therefore, the driving assistance device 100 performs steering assistance for detouring around the pedestrian 20, and generates the target trajectory 12b offset from the center of the traveling lane 2 toward the lane boundary line 6 so that the target trajectory 12b does not overlap the predicted range 67. In Case 7 where the wall 40 that is the second obstacle is present, the execution conditions of the steering assistance for detouring around the pedestrian 20 are relaxed compared with Case 6 where the wall 40 is not present. Thus, it is possible to avoid collision between the pedestrian 20 and the target vehicle 10 in the situation where the pedestrian 20 may come out in front of the target vehicle 10 with a higher possibility.

3-2. Procedure of Driving Assistance Control

The driving assistance device 100 performs the driving assistance control in accordance with a procedure shown in FIG. 13. FIG. 13 is a flowchart showing the procedure of the driving assistance control to be performed by the driving assistance device 100 in the second embodiment. The process in the flowchart shown in FIG. 13 is performed when a moving object is detected ahead of the target vehicle 10 and a longitudinal obstacle (first obstacle) that hinders the moving object from moving in the longitudinal direction is detected.

In step S201 of the flowchart shown in FIG. 13, determination is made as to whether the size of the longitudinal obstacle is larger than the specified value. When the size of the longitudinal obstacle is larger than the specified value, determination is made that the longitudinal obstacle is the first type longitudinal obstacle. When the size of the longitudinal obstacle is equal to or smaller than the specified value, determination is made that the longitudinal obstacle is the second type longitudinal obstacle. Cases 1 to 5 are included in cases where the result of the determination in step S201 is positive. The result of the determination in step S201 is stored in a memory.

In step S202, determination is made as to whether a lateral obstacle is present around the moving object. Cases 3, 5, and 7 are included in cases where the result of the determination in step S202 is positive. The result of the determination in step S202 is stored in the memory.

In step S203, determination is made as to whether the moving object can pass through a space between the longitudinal obstacle and the lateral obstacle. This determination is made only when the result of the determination in step S202 is positive. When the moving object can pass through the space between the longitudinal obstacle and the lateral obstacle, the lateral obstacle does not correspond to the second obstacle.

In step S204, a predicted range of a future position of the moving object is calculated based on the results of the determination in steps S201 to S203 and the current position, the moving direction, and the moving speed of the moving object.

In step S205, determination is made as to whether the predicted range of the future position of the moving object calculated in step S204 overlaps the trajectory 11 of the target vehicle 10. When the predicted range does not overlap the trajectory of the target vehicle 10, the steering assistance for detouring around the moving object is not performed. Cases 2, 4, and 6 are included in cases where the result of the determination in step S205 is negative and the steering assistance is not performed.

When the predicted range overlaps the trajectory of the target vehicle 10, the process proceeds to step S206. In step S206, the steering assistance for detouring around the moving object is performed. Cases 1, 3, 5, and 7 are included in cases where the result of the determination in step S205 is positive and the steering assistance is performed.

3-3. Configuration of Driving Assistance Device

The configuration of the driving assistance device 100 for performing the driving assistance control can be represented by the block diagram shown in FIG. 9 as in the first embodiment. That is, the hardware of the driving assistance device 100 according to the second embodiment is in common with that of the first embodiment. The only difference between the second embodiment and the first embodiment is the contents of the driving assistance program 113 stored in the program memory 112.

What is claimed is:

1. A driving assistance device comprising:
   a sensor configured to detect a moving object ahead of a target vehicle and obstacles including a first obstacle and a second obstacle; and
   a control device configured to:
   determine whether the second obstacle is present, the second obstacle being located opposite to a traveling lane of the target vehicle with respect to the first obstacle in a lateral direction and forcing the moving object to move in the lateral direction toward the traveling lane due to collaborative action with the first obstacle, the first obstacle hindering the moving object from moving in a longitudinal direction, the longitudinal direction being a direction along the traveling lane of the target vehicle, and the lateral direction being a width direction of the traveling lane of the target vehicle; and
   relax an execution condition of steering assistance for detouring around the moving object in a case where the second obstacle is present rather than in a case where the second obstacle is not present.

2. The driving assistance device according to claim 1, wherein the control device is configured to relax the execution condition of the steering assistance by at least:
   performing the steering assistance when the moving object is located in an assistance execution area extending from the first obstacle toward the moving object in the longitudinal direction; and
   expanding the assistance execution area in the case where the second obstacle is present rather than in the case where the second obstacle is not present.

3. The driving assistance device according to claim 2, wherein the control device is configured to expand the assistance execution area by at least expanding the assistance execution area from a near side to a far side of the traveling lane in the lateral direction.

4. The driving assistance device according to claim 3, wherein the control device is configured to expand the assistance execution area by at least:
   setting, when the second obstacle is not present, a first area near the traveling lane with respect to the first obstacle in the lateral direction as the assistance execution area; and
   setting, when the second obstacle is present, the first area and a second area opposite to the traveling lane with respect to the first obstacle in the lateral direction as the assistance execution area.

5. The driving assistance device according to claim 2, wherein the control device is configured to expand the assistance execution area by at least:
   not providing the assistance execution area when the second obstacle is not present; and
   providing the assistance execution area when the second obstacle is present.

6. The driving assistance device according to claim 5, wherein the control device is configured to provide the assistance execution area by at least setting an area opposite to the traveling lane with respect to the first obstacle in the lateral direction as at least a part of the assistance execution area.

7. The driving assistance device according to claim 1, wherein the control device is configured to relax the execution condition of the steering assistance by at least:
   performing the steering assistance when a predicted range of a future position of the moving object overlaps a trajectory of the target vehicle; and
   setting the predicted range closer to the traveling lane in the lateral direction in the case where the second obstacle is present than in the case where the second obstacle is not present.

8. The driving assistance device according to claim 1, wherein the second obstacle is an object in which a distance from the first obstacle in the lateral direction is smaller than a lower limit value.

9. The driving assistance device according to claim 1, wherein the second obstacle is an obstacle that forces the moving object to move in the lateral direction toward the traveling lane due to action caused by combination and coordination of action of the second obstacle on the moving object and action of the first obstacle on the moving object.

10. The driving assistance device according to claim 1, wherein the second obstacle is an obstacle expected to increase a probability of movement of the moving object in the lateral direction toward the traveling lane due to a physical constraint on the moving object from a positional relationship among three elements including the second obstacle, the first obstacle, and the moving object.

11. A driving assistance method comprising:
   detecting, by a sensor, a moving object ahead of a target vehicle and obstacles including a first obstacle and a second obstacle;
   determining, by a control device, whether the second obstacle is present, the second obstacle being located opposite to a traveling lane of the target vehicle with respect to the first obstacle in a lateral direction and forcing the moving object to move in the lateral direction toward the traveling lane due to collaborative action with the first obstacle, the first obstacle hindering the moving object from moving in a longitudinal direction, the longitudinal direction being a direction along the traveling lane of the target vehicle, and the lateral direction being a width direction of the traveling lane of the target vehicle; and relaxing, by the control device, an execution condition of steering assistance for detouring around the moving object in a case where the second obstacle is present rather than in a case where the second obstacle is not present.

12. A non-transitory storage medium storing instructions that are executable by one or more processors and that cause the one or more processors to perform functions comprising:

determining whether a second obstacle is present, the second obstacle being located opposite to a traveling lane of a target vehicle with respect to a first obstacle in a lateral direction and forcing a moving object ahead of the target vehicle to move in the lateral direction toward the traveling lane due to collaborative action with the first obstacle, the first obstacle hindering the moving object from moving in a longitudinal direction, the moving object, the first obstacle, and the second obstacle being detected by a sensor, the longitudinal direction being a direction along the traveling lane of the target vehicle, and the lateral direction being a width direction of the traveling lane of the target vehicle; and relaxing an execution condition of steering assistance for detouring around the moving object in a case where the second obstacle is present rather than in a case where the second obstacle is not present.

\* \* \* \* \*